US008145223B2

(12) United States Patent
Guey

(10) Patent No.: US 8,145,223 B2
(45) Date of Patent: *Mar. 27, 2012

(54) INTER-CELL INTERFERENCE MITIGATION

(75) Inventor: Jiann-Ching Guey, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 372 days.

This patent is subject to a terminal disclaimer.

(21) Appl. No.: 12/491,675

(22) Filed: Jun. 25, 2009

(65) Prior Publication Data
US 2010/0261482 A1 Oct. 14, 2010

Related U.S. Application Data

(60) Provisional application No. 61/167,925, filed on Apr. 9, 2009.

(51) Int. Cl.
H04W 40/00 (2009.01)
(52) U.S. Cl. .......................................... 455/447; 455/452
(58) Field of Classification Search .................. 455/447, 455/452–452.2
See application file for complete search history.

(56) References Cited

U.S. PATENT DOCUMENTS

| 2002/0183064 | A1* | 12/2002 | Gopalakrishnan et al. | 455/452 |
|---|---|---|---|---|
| 2006/0217158 | A1* | 9/2006 | Uwano et al. | 455/562.1 |
| 2010/0167717 | A1* | 7/2010 | Hafeez et al. | 455/422.1 |
| 2010/0173660 | A1* | 7/2010 | Liu et al. | 455/501 |
| 2010/0261493 | A1* | 10/2010 | Guey et al. | 455/501 |
| 2010/0290382 | A1* | 11/2010 | Hui et al. | 370/312 |
| 2010/0291936 | A1* | 11/2010 | Zangi et al. | 455/450 |
| 2010/0323712 | A1* | 12/2010 | Guey et al. | 455/452.2 |

OTHER PUBLICATIONS

Bengtsson et al. D1.4 Initial Report on Advanced Multiple Antenna Systems [Online] Jan. 16, 2009, Wireless World Initiative New Radio—Winner+, URL:http://projects.celtic-initiative.org/winner+/WINNER+%20Deliverables/D1.4_v1.0 pdf>.
Zhang et al. Networked MIMO with Clustered Linear Precoding Apr. 1, 2009, IEEE Transactions on Wireless Communications, IEEE Service Center, Piscataway, NJ, US.
Karakayali et al: "Network Coordination for Spectrally Efficient Communications in Cellular Systems" IEEE Wireless Communications, Aug. 2006, pp. 56-61.
Ericsson: "On Inter-cell Interference Coordination Schemes without/with Traffic Load Indication", 3GPP TSG-RAN WG1 R1-072456, May 7, 2007, Kobe, Japan.
Alcatel-Lucent Shanghai Bell: "A progressive multi-cell MIMO transmission with sequential linear precoding design in TDD systems" 3GPP TSG RAN WG1MeetingR1-092316 Jun. 29, 2009 Los Angeles, USA.

* cited by examiner

Primary Examiner — Jean A Gelin
Assistant Examiner — Nathan Taylor

(57) ABSTRACT

A method and controller for reducing inter-cell interference within a Coordinated Multi-Point (CoMP) cellular network architecture. Multiple CoMP cells in the network architecture are grouped into a number of mutually exclusive subsets. The CoMP cells in each subset are sufficiently separated from each other geographically so that no inter-cell interference occurs among them, and thus they can be scheduled independently. Each subset then takes turn scheduling in a certain order. As each subset schedules its transmissions, it avoids causing interference to subsets that have already scheduled, and then passes sufficient information to the remaining subsets so that the same interference avoidance measures can be taken. The scheduling and passing of the information is preferably performed before the data transmission phase, which occurs once every Transmission Time Interval (TTI).

20 Claims, 9 Drawing Sheets

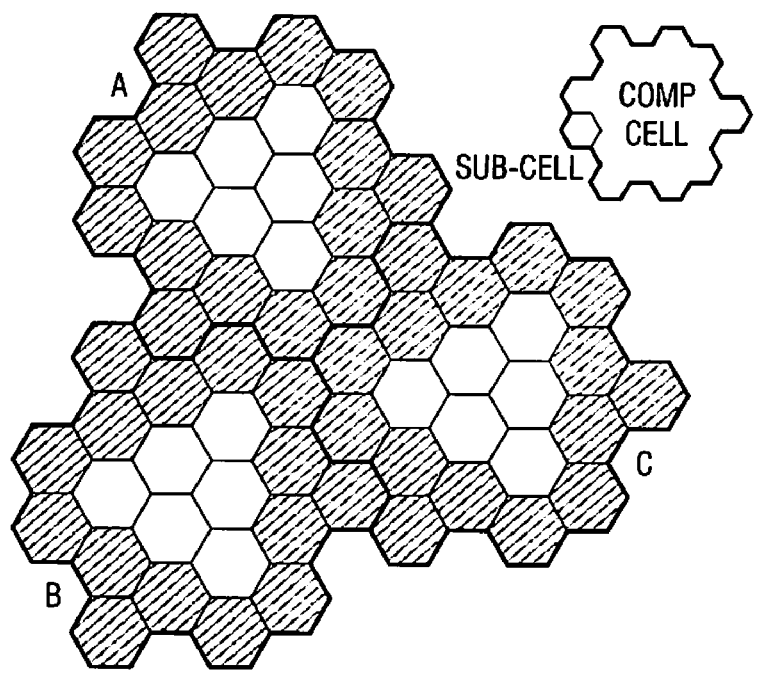
FIG. 1
*(Prior Art)*
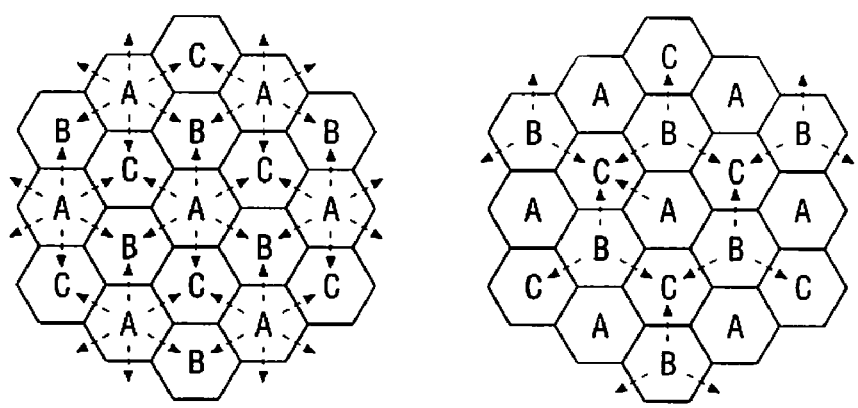
FIG. 2A          FIG. 2B

INTER-CELL INTERFERENCE MITIGATION

CROSS-REFERENCE TO RELATED APPLICATIONS

This application claims the benefit of U.S. Provisional Application No. 61/167,925 filed Apr. 9, 2009.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to wireless cellular telecommunication systems. More particularly, and not by way of limitation, the invention is directed to a system and method for mitigating inter-cell interference through coherent, coordinated multipoint transmission and reception.

Inter-cell interference in a wireless cellular telecommunication network is one of the most dominant sources for performance impairment. Traditional approaches to mitigating this impairment include measures such as frequency reuse and spread spectrum. More recently, Inter-Cell Interference Coordination (ICIC) solutions that rely on the ad hoc coordination of multiple cells have also been proposed. See, for example, the Ericsson Contribution, "On Inter-cell Interference Coordination Schemes without/with Traffic Load Indication," 3GPP TSG-RAN WG1 R1-072456.

One solution to mitigate the inter-cell interference is to connect multiple cells to a central controller unit, which coordinates the transmission and reception to and from the User Equipments (UEs) so that interference can be avoided by scheduling, or can be actively suppressed using signal processing techniques. This type of solution may be referred to as Coordinated Multi-Point (CoMP) transmission and reception. In this context, a "CoMP cell" is a collection of geographically contiguous cells, referred to as sub-cells, connected to the same central unit. Signal processing techniques that actively cancel or suppress interference are sometimes referred to as coherent CoMP techniques. One such signal processing technique, referred to as Zero Forcing, has been shown to achieve significant gain. More details regarding CoMP and Zero Forcing may be gained from "Network Coordination for Spectrally Efficient Communications in Cellular Systems," by Karakayali, Foschini, and Valenzuela.

A drawback of utilizing a signal processing technique such as Zero Forcing is that the instantaneous Multiple-input Multiple-Output (MIMO) channels between all the UEs and cells must be communicated to the central agent. This can only be achieved by installing a high capacity back haul channel. Additionally, the performance of such ad hoc approaches may not be sufficient to meet future requirements.

FIG. 1 is an illustrative drawing of three adjacent CoMP cells A, B, and C, each comprising a number of sub-cells. In a CoMP architecture, the interference between sub-cells is only coordinated or suppressed within each CoMP cell. In the context of CoMP, this type of interference between sub-cells in a single CoMP cell is referred to as intra-CoMP-cell interference. However, there is no coordination between the larger CoMP cells, and thus the border sub-cells, indicated by shading, may experience interference from transmissions in the border sub-cells of neighboring CoMP cells. The interference among multiple CoMP cells along the shaded border areas shown in FIG. 1 is referred to as inter-CoMP-cell interference. This type of interference still remains a major source of performance impairment.

SUMMARY

The present invention provides a system and method for reducing inter-cell interference within a CoMP architecture, which overcomes the shortcomings of the prior art. The invention provides an approximate optimal global transmission/reception decision without a global central unit. Seamless inter-cell interference coordination eliminates the border effect, which still remains a major source of performance impairment in prior art systems. A selected scheduling criterion accounts for post-processing Signal-to-Interference-Ratio (SIR).

In one embodiment, multiple CoMP cells in a system deployment are grouped into a number of mutually exclusive subsets. The CoMP cells in each subset are sufficiently separated from each other geographically so that no inter-cell interference occurs among them. Therefore, they can be scheduled independently. Each subset then takes turn scheduling in a certain order. As each subset schedules its transmissions, it avoids causing interference to subsets that have already scheduled, and then passes sufficient information to the remaining subsets so that the same interference avoidance measures can be taken. The scheduling and passing of the information is preferably performed before the data transmission phase, which occurs once every Transmission Time Interval (TTI).

In an exemplary embodiment, the present invention is directed to a method of reducing inter-cell interference within a CoMP cellular network architecture having a plurality of CoMP cells, wherein each CoMP cell includes a plurality of sub-cells in which radio transmissions are made to and from UEs. The method includes the steps of grouping the plurality of CoMP cells into a number of mutually exclusive subsets, wherein the CoMP cells in each subset are sufficiently separated from each other geographically so that no inter-CoMP-cell interference occurs among the CoMP cells in any given subset; and scheduling transmissions to and from UEs in the sub-cells of the CoMP cells in a first subset to minimize intra-CoMP-cell interference among the sub-cells within the CoMP cells in the first subset. In one embodiment, transmissions in the downlink direction in a given CoMP cell in the first subset are scheduled so that none of the UEs experience interference that exceeds a threshold $\lambda$. In another embodiment, transmissions in the downlink direction in a given CoMP cell in the first subset are scheduled so that the total interference experienced by any of the UEs does not result in a signal-to-interference ratio (SIR) budget $\rho$ being exceeded. The method also includes passing scheduling information from each of the CoMP cells in the first subset to neighboring CoMP cells in all other subsets; and scheduling transmissions to and from UEs in the sub-cells of the CoMP cells in a second subset, wherein transmissions in the second subset are scheduled to minimize intra-CoMP-cell interference among the sub-cells within the CoMP cells in the second subset, and wherein transmissions in the second subset are also scheduled utilizing the scheduling information received from the first subset to minimize inter-CoMP-cell interference with CoMP cells in the first subset.

The method may also include the steps of passing scheduling information from each of the CoMP cells in the second subset to neighboring CoMP cells in all other subsets except the first subset; and scheduling transmissions to and from UEs in the sub-cells of the CoMP cells in a third subset, wherein transmissions in the third subset are scheduled to minimize intra-CoMP-cell interference among the sub-cells within the CoMP cells in the third subset, and wherein transmissions in the third subset are also scheduled utilizing the scheduling information received from the first and second subsets to minimize inter-CoMP-cell interference with CoMP cells in the first and second subsets.

In another embodiment, the present invention is directed to a centralized CoMP cell controller communicatively linked to a plurality of base stations, each base station providing radio communications to and from a plurality of UEs in a sub-cell of a first CoMP cell having a plurality of sub-cells. The CoMP cell controller includes a scheduler for scheduling transmissions to and from UEs in the sub-cells of the first CoMP cell to minimize intra-CoMP-cell interference among the sub-cells within the first CoMP cell. The scheduler may include means for scheduling transmissions such that no UE in the CoMP cell experiences interference greater than a defined threshold $\lambda$. Alternatively, the scheduler may schedule transmissions in the downlink direction in a given CoMP cell in the first subset so that the total interference experienced by any of the UEs does not result in a SIR budget $\rho$ being exceeded. The CoMP cell controller also includes a first communication interface for sending to a controller of a neighboring second CoMP cell, scheduling information regarding transmissions scheduled to and from UEs in sub-cells at a border between the first and second CoMP cells, in advance of the transmissions.

The CoMP cell controller may also include a second communication interface for receiving from a controller of a third CoMP cell, scheduling information regarding transmissions scheduled to and from UEs in sub-cells in the third CoMP cell, wherein the scheduler schedules transmissions to and from UEs in sub-cells at a border between the first and third CoMP cells based on both intra-CoMP-cell interference levels among the sub-cells within the first CoMP cell as well as the scheduling information received from the controller of the third CoMP cell.

In another embodiment, the present invention is directed to a system in a cellular communication network for minimizing inter-cell interference among CoMP cells. The system includes a first CoMP cell controller communicatively linked to a first plurality of network transceivers, each transceiver providing radio communications to UEs in a sub-cell of the CoMP cell; and a second CoMP cell controller communicatively linked to a second plurality of network transceivers neighboring the first plurality of network transceivers. The first and second CoMP cell controllers each include a scheduler for scheduling transmissions with UEs in sub-cells of the first and second CoMP cells, respectively, to ensure that no UE in each respective CoMP cell experiences interference greater than a defined threshold $\lambda$. The CoMP cell controllers also include a communication interface for transmitting from the first CoMP cell controller to the second CoMP cell controller, scheduling information generated by the scheduler of the first CoMP cell controller regarding transmissions scheduled to and from UEs in sub-cells at the border of the first CoMP cell, in advance of the transmissions. The scheduler of the second CoMP cell controller further includes means for utilizing the scheduling information transmitted by the first CoMP cell controller to schedule transmission to and from UEs in the in sub-cells at the border of the second CoMP cell so as to minimize inter-CoMP cell interference between the first CoMP cell and the second CoMP cell.

BRIEF DESCRIPTION OF THE SEVERAL VIEWS OF THE DRAWING

In the following section, the invention will be described with reference to exemplary embodiments illustrated in the figures, in which:

FIG. 1 (Prior Art) is an illustrative drawing of three adjacent Coordinated Multi-Point (CoMP) cells, each comprising a number of sub-cells;

FIG. 2 is an illustrative drawing of a grouping of CoMP cells in a system deployment in an embodiment of the present invention;

DETAILED DESCRIPTION

Central Controller Embodiment

A first embodiment of the present invention employs the same centralized architecture as previous CoMP techniques, but communicates less information to the central CoMP cell controller. The CoMP cell controller then schedules users to be served by their attached cells in a manner such that the mutual interference among them is minimized.

FIGS. 2A and 2B are illustrative drawings of a grouping of CoMP cells in a system deployment in an exemplary embodiment of the present invention. In order to mitigate the inter-CoMP-cell interference among border sub-cells in neighboring CoMP cells, the multiple CoMP cells in a system deployment are grouped into a number of mutually exclusive subsets such as A, B, and C. The CoMP cells in each subset are sufficiently separated from each other that no inter-cell interference occurs among them and therefore they can be scheduled independently. Each subset then takes turn scheduling transmissions in its sub-cells in a certain order. For example, subset A, followed by subset B, and then subset C as shown in the illustrated example). As each subset schedules its transmissions, it avoids causing interference to subsets that have already scheduled, and then passes sufficient information to the remaining subsets so that the same interference avoidance measures can be taken. The scheduling and information passing preferably all transpire before the data transmission phase, which occurs once every TTI.

Referring to FIG. 2A, the CoMP cells in subset A send information regarding the scheduling of their border sub-cells to all six of their neighboring CoMP cells so that the neighboring CoMP cells can take adequate action to avoid generating interference to the A cells. Once this process is completed, the B cells broadcast such information to the C cells as shown in FIG. 2B. Because of the action that the B cells have taken, little or no interference is generated to the A cells. The B cells only need to broadcast the appropriate information to the C cells so that the C cells can take the necessary action to avoid generating interference to both the A cells and B cells. The C cells do not need to broadcast any information since they are the last to perform the scheduling action.

Figure 3:
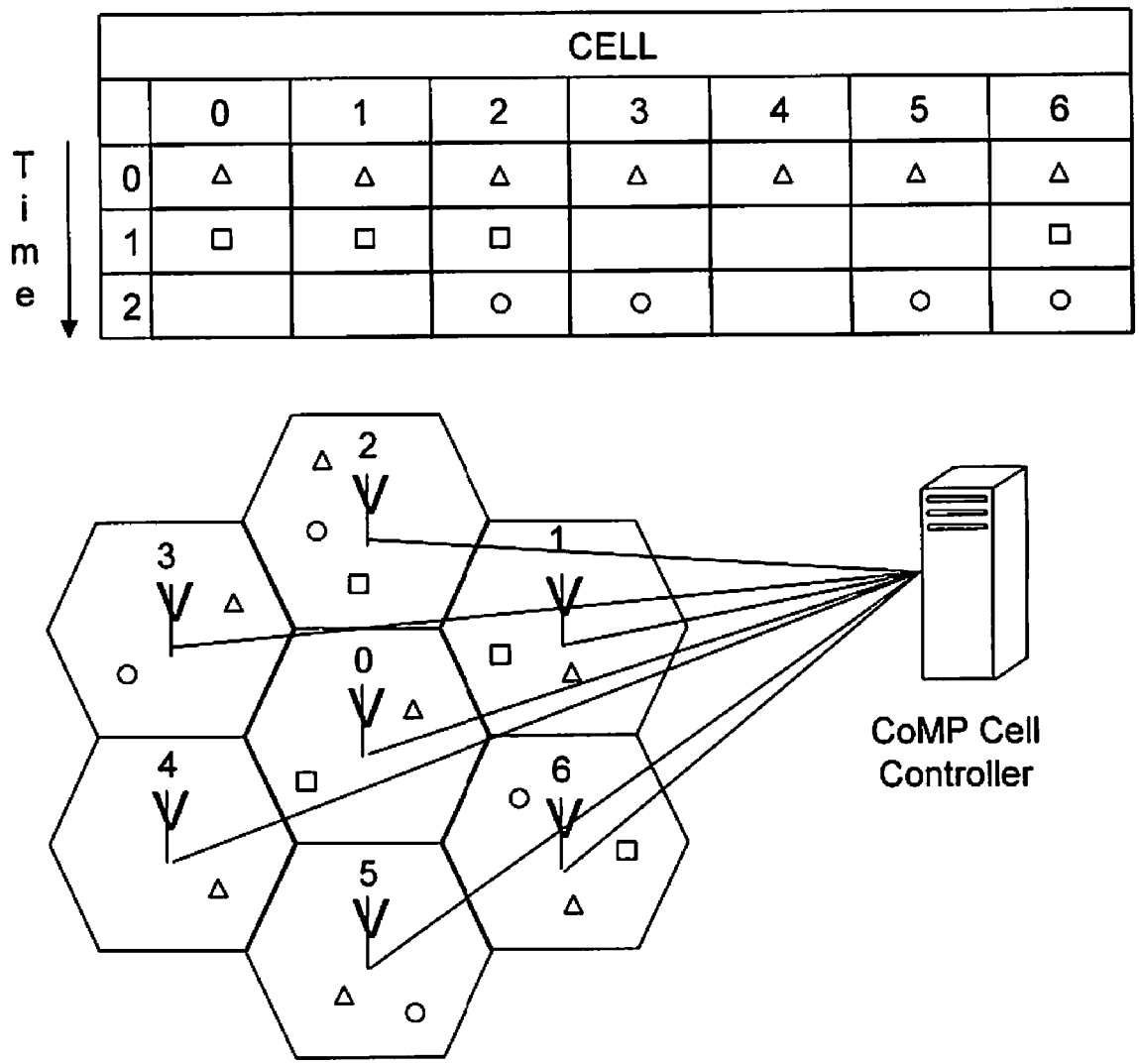
FIG. 3 illustrates a simple example of a schedule of users.

FIG. 3 illustrates a simple example of a CoMP cell, a CoMP cell controller 31, and a "schedule" generated by the CoMP cell controller. The schedule is essentially a list of users being served at different times. The triangles represent the UEs in different cells scheduled in the first time interval, the squares represent the UEs scheduled in the second time interval, and the circles represent the UEs scheduled in the third time interval. There is no particular relationship among UEs designated by the same shape in this example; they just happen to be scheduled to be served at the same time.

The information to be communicated to the CoMP cell controller may be as simple as the path gains between the UEs and the base stations. However, the optimal schedule list under certain constraints may be difficult to determine since the typical number of users in the system makes the hypothesis space prohibitively large for an exhaustive search.

For fairness, the order of scheduling information transmission may be rotated among the CoMP cell sets according to a predetermined scheme. For example, a round-robin rotation of scheduling information transmission priority among the A, B, and C CoMP cells may be utilized. Other rotation schemes within the scope of the present invention include rotation based on current or recent past scheduling activity (i.e., the CoMP cell sets having the high traffic load have the first scheduling priority). Additionally, a priority-based rotation scheme may be combined with a fairness component, such as in the proportional fairness scheme utilized in high speed packet downlink channels of some wireless network protocols. In general, within the scope of the present invention, the priority of scheduling information transmission among plural sets of CoMP cells may be determined according to any scheduling protocol that achieves desirable network performance goals. Of course, such protocols are not limited to operation with only three sets of CoMP cells.

In this embodiment, the interference is determined by the path gains between the UEs and their surrounding sub-cells. The scheduler attempts to group and order UEs to be served simultaneously by their attached sub-cells in a way such that a certain Signal-to-Interference-Ratio (SIR) target is met.

It is assumed that each cell knows the path gain between the base station and the UEs attached to it. The cells then communicate this information to the central unit, which then forms a path gain matrix:

$$G = \begin{bmatrix} g_{11} & g_{12} & \cdots & \cdots & g_{1N} \\ g_{21} & g_{22} & \cdots & \cdots & g_{2N} \\ \vdots & \vdots & \ddots & & \vdots \\ \vdots & \vdots & & \ddots & \vdots \\ g_{M1} & g_{M2} & \cdots & \cdots & g_{MN} \end{bmatrix},$$

where $g_{mn}$ is the path gain between the m'th UE and the n'th base station. For each UE $i \in \{1, \ldots, M\}$, there is a corresponding strongest base station $\sigma(i)$ where $$\sigma(i) = \operatorname*{argmax}_{j \in \{1, \ldots, N\}} g_{ij}.$$

For each base station $j \in \{1, \ldots, N\}$, there is a corresponding strongest UE $\mu(j)$ where $$\mu(j) = \operatorname*{argmax}_{i \in \{1, \ldots, M\}} g_{ij}.$$

With this gain matrix, the central unit then performs the scheduling. The schedule essentially instructs each base station whether to transmit or not, and if so, to which UE and whether to schedule an uplink UE.

Figure 4:
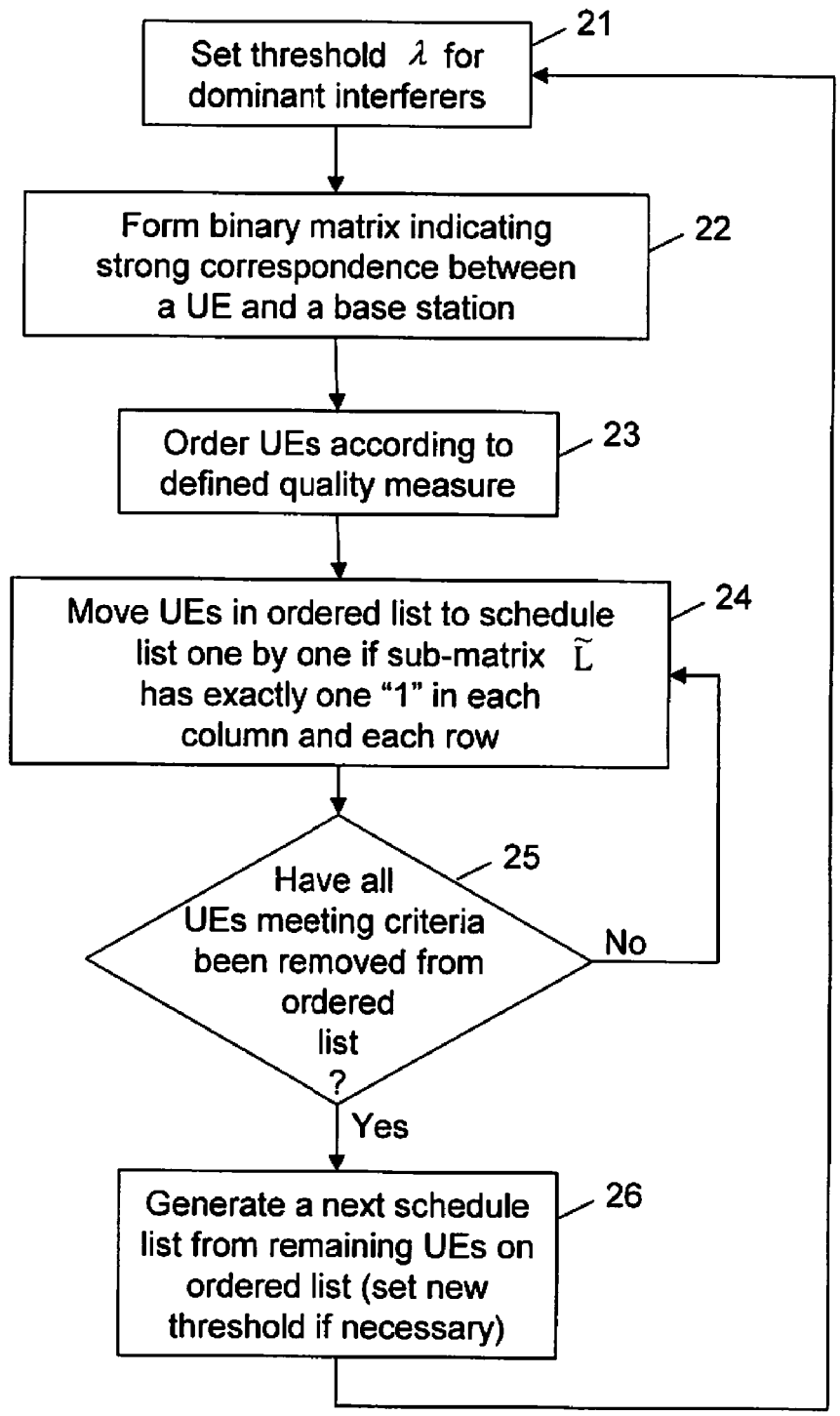
FIG. 4 is a flow chart illustrating the steps of a first embodiment of the present invention utilizing a centralized scheduler.

FIG. 4 is a flow chart illustrating the steps of a first embodiment of the present invention utilizing a centralized scheduler for the downlink direction. This embodiment guarantees none of the interference experienced by a given UE exceeds a defined threshold. In the downlink direction, the following procedure is performed.

At step 21, threshold $\lambda$ is set for dominant interferers. At step 22, a binary matrix indicating strong correspondence between a UE and a base station is formed. For the downlink, $$L = \begin{bmatrix} l_{11} & l_{12} & \cdots & \cdots & l_{1N} \\ l_{21} & l_{22} & \cdots & \cdots & l_{2N} \\ \vdots & \vdots & \ddots & & \vdots \\ \vdots & \vdots & & \ddots & \vdots \\ l_{M1} & l_{M2} & \cdots & \cdots & l_{MN} \end{bmatrix},$$

where $l_{ij}=1$ if $g_{ij}/g_{i\sigma(i)} > \lambda$ and $l_{ij}=0$ otherwise.

At step 23, the UEs are ordered according to a defined quality measure such as, for example, the highest path gain between the UE and all the base stations, or the number of strong base stations seen by a UE.

At step 24, move the UEs in the ordered list to the schedule list one by one if the sub-matrix:

$$\tilde{L} = \begin{bmatrix} l_{\mu(j_1)j_1} & l_{\mu(j_1)j_2} & l_{\mu(j_1)j_3} & \cdots \\ l_{\mu(j_2)j_1} & l_{\mu(j_2)j_2} & l_{\mu(j_2)j_3} & \cdots \\ l_{\mu(j_3)j_1} & l_{\mu(j_3)j_2} & l_{\mu(j_3)j_3} & \cdots \\ \vdots & \vdots & \vdots & \ddots \end{bmatrix}$$

has exactly one "1" in each column and each row, where $\{i_1, i_2, \ldots\}$ is the set of UEs in the schedule and $\{\sigma(i_1), \sigma(i_2), \ldots\}$ is the set of the corresponding serving base stations.

At step 25, it is determined whether all UEs meeting the criterion of step 24 have been moved from the ordered list to the schedule list. If not, the method continues to move UEs meeting the criterion to the schedule list. When all UEs meeting the criterion have been moved to the schedule list, the method moves to step 26 and generates a next schedule list from the remaining UEs on the ordered list. The method then returns to step 21 and repeats the process for the remaining UEs on the ordered list. A different threshold λ may be used when necessary.

Figure 5:
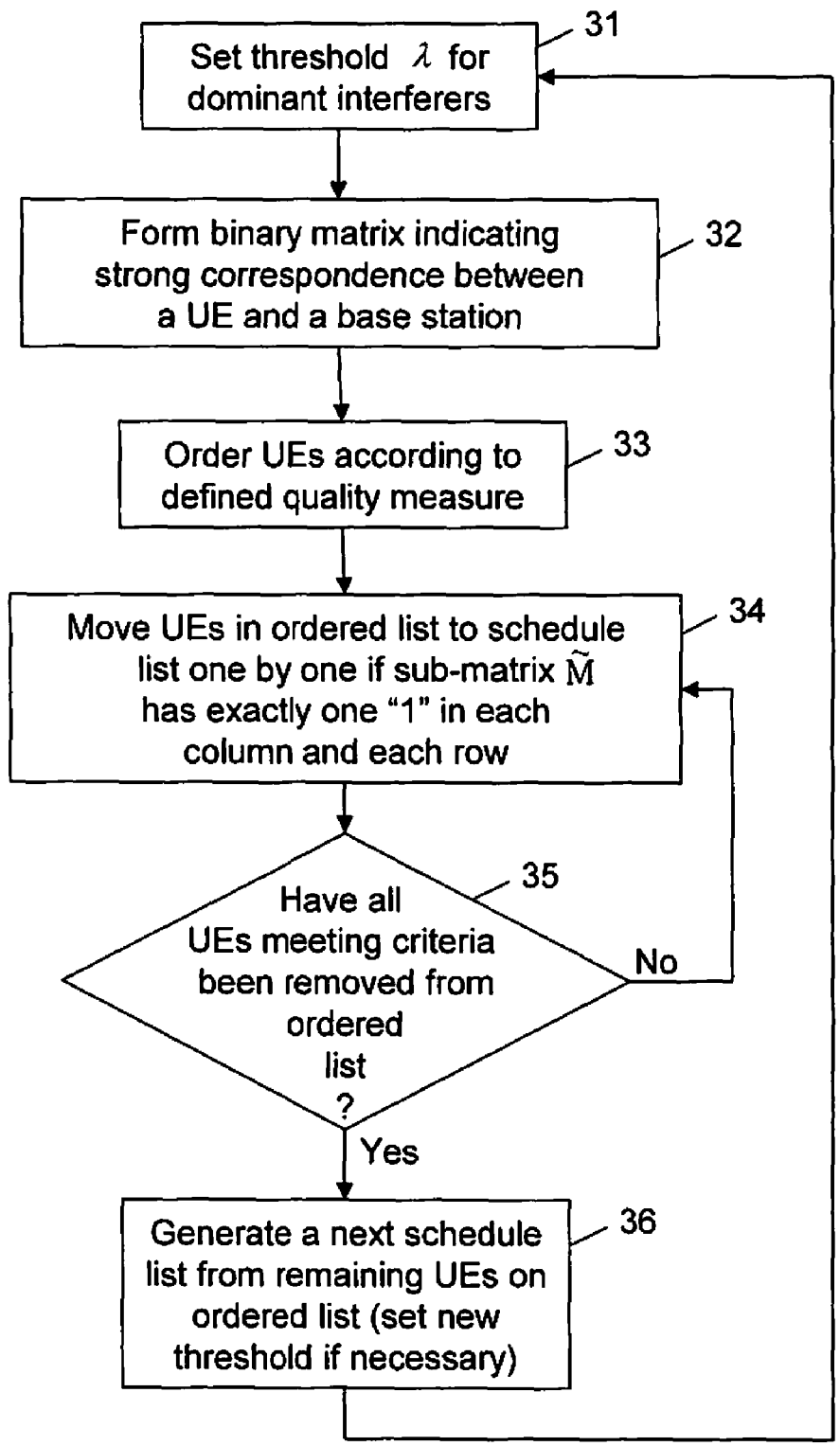
FIG. 5 is a flow chart illustrating the steps of the first embodiment of the present invention utilizing a centralized scheduler for the uplink direction.

FIG. 5 is a flow chart illustrating the steps of the first embodiment of the present invention utilizing a centralized scheduler for the uplink direction. At step 31, a threshold λ is set for dominant interferers. At step 32, a binary matrix indicating strong correspondence between a UE and a base station is formed. For all UEs $\{i_1, i_2, \ldots\}$ in the system on the uplink, $$M = \begin{bmatrix} m_{i_1\sigma(i_1)} & m_{i_1\sigma(i_2)} & m_{i_1\sigma(i_3)} & \cdots \\ m_{i_2\sigma(i_1)} & m_{i_2\sigma(i_2)} & m_{i_2\sigma(i_3)} & \cdots \\ m_{i_3\sigma(i_1)} & m_{i_3\sigma(i_2)} & m_{i_3\sigma(i_3)} & \cdots \\ \vdots & \vdots & \vdots & \ddots \end{bmatrix},$$

where $m_{ij}=1$ if $g_{i\sigma(j)}/g_{j\sigma(j)} > \lambda$ and $m_{ij}=0$ otherwise.

At step 33, the UEs are ordered according to a defined quality measure such as, for example, the highest path gain between the UE and all the base stations, or the number of strong base stations seen by the UE.

At step 34, the UEs in the ordered list are moved to the schedule list one by one if the sub-matrix:

$$\tilde{M} = \begin{bmatrix} m_{i_1\sigma(i_1)} & m_{i_1\sigma(i_2)} & m_{i_1\sigma(i_3)} & \cdots \\ m_{i_2\sigma(i_1)} & m_{i_2\sigma(i_2)} & m_{i_2\sigma(i_3)} & \cdots \\ m_{i_3\sigma(i_1)} & m_{i_3\sigma(i_2)} & m_{i_3\sigma(i_3)} & \cdots \\ \vdots & \vdots & \vdots & \ddots \end{bmatrix}$$

has exactly one "1" in each column and each row, where $\{i_1, i_2, \ldots\}$ is the set of UEs in the schedule and $\{\sigma(i_1), \sigma(i_2), \ldots\}$ is the set of the corresponding serving base stations.

At step 35, it is determined whether all UEs meeting the criterion of step 34 have been moved from the ordered list to the schedule list. If not, the method continues to move UEs meeting the criterion to the schedule list. When all UEs meeting the criterion have been moved to the schedule list, the method moves to step 36 and generates a next schedule list from the remaining UEs on the ordered list. The method then returns to step 31 and repeats the process for the remaining UEs on the ordered list. A different threshold λ may be used when necessary.

Figure 6:
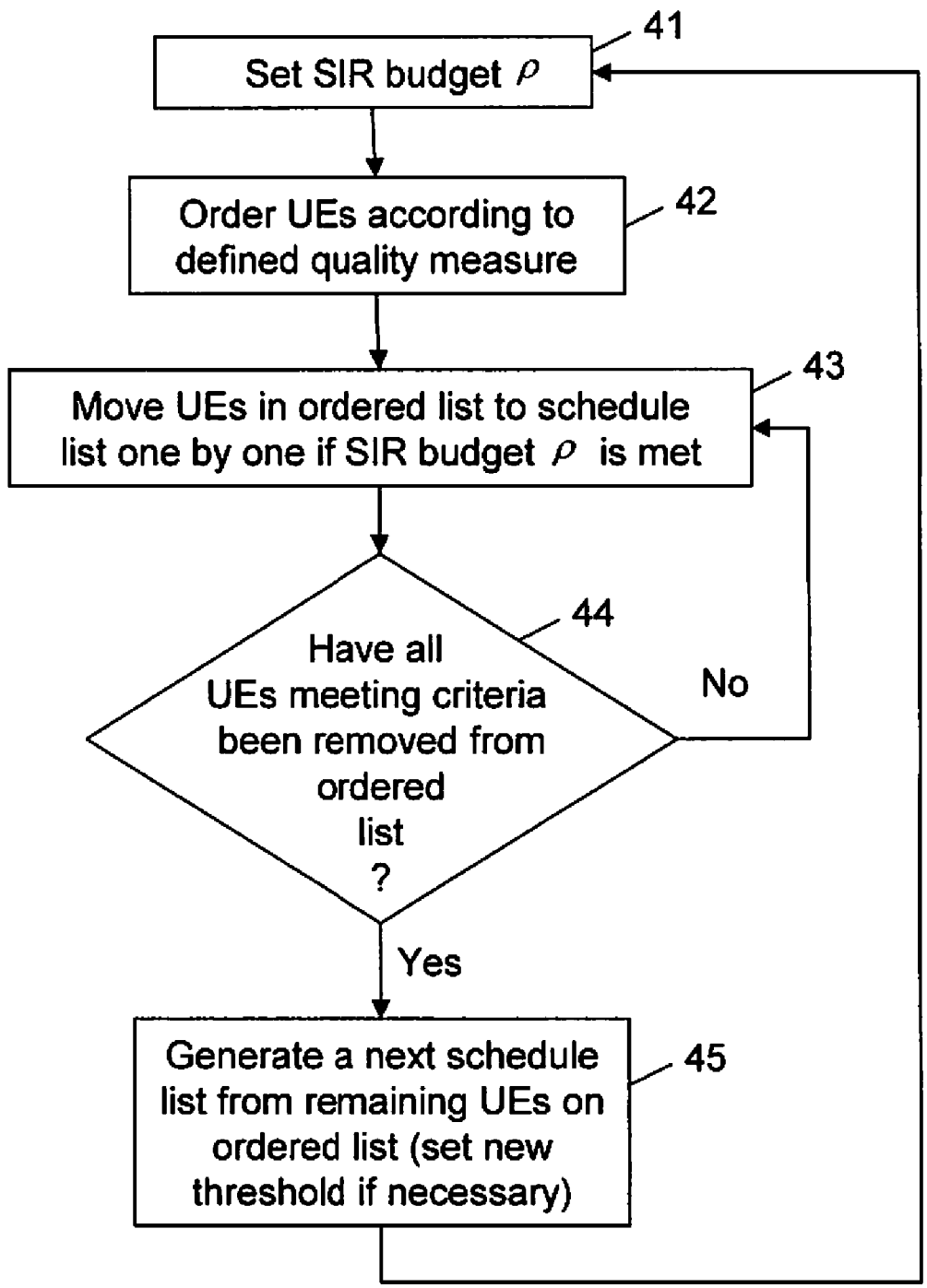
FIG. 6 is a flow chart illustrating the steps of a second embodiment of the present invention utilizing a centralized scheduler.

FIG. 6 is a flow chart illustrating the steps of a second embodiment of the present invention utilizing a centralized scheduler. This embodiment guarantees the total interference experienced by a user does not exceed a certain threshold. At step 41, an SIR budget ρ is set. At step 42, the UEs are ordered according to a defined measure such as, for example, the highest path gain between the terminal and all the base stations, or the proximity to the cell border. At step 43, the UEs in the ordered list are moved to the schedule list one by one if the SIR budget ρ is met. If U is the set of indices of the UE in the schedule list and B is the set of indices of the corresponding serving base stations, then on the uplink, the SIR budget is met if for all i∈U, $$\frac{g_{i\sigma(i)}}{\sum_{j\in U, j\neq i} g_{j\sigma(i)}} \geq \rho,$$

where σ(i) is the serving base station of UE i.

Similarly for the downlink, the SIR budget ρ is met if for all i∈U, $$\frac{g_{i\sigma(i)}}{\sum_{j\in B, j\neq \sigma(i)} g_{ij}} \geq \rho.$$

At step 44, it is determined whether all UEs for which the SIR budget ρ is met have been moved from the ordered list to the schedule list. If not, the method continues to move UEs for which the SIR budget ρ is met to the schedule list. When all UEs for which the SIR budget ρ is met have been moved to the schedule list, the method moves to step 45 and generates a next schedule list from the remaining UEs on the ordered list. The method then returns to step 41 and repeats the process for the remaining UEs on the ordered list. A different SIR budget ρ may be used when necessary.

In both embodiments described above, the threshold levels can be adjusted to achieve a desirable level of throughput or latency. A higher SIR requirement leads to more scarcely scheduled users and therefore longer latency and a higher instantaneous user data rate.

The invention may also be applied to individual sub-bands within a wider bandwidth (e.g., in an FDMA system). The term "cells" is understood to include conventional cellular network cells as well as generalized antenna beams in a fixed or adaptive beamforming system.

The centralized scheduler embodiments described above provide interference avoidance via coordinated transmission and reception of data streams to and from multiple terminals. Simple thresholding methods provide feasible alternatives to the mathematically intractable optimization problem. Communication between the central unit and the multiple access points is greatly reduced while providing much better performance than conventional systems.

Figure 7:
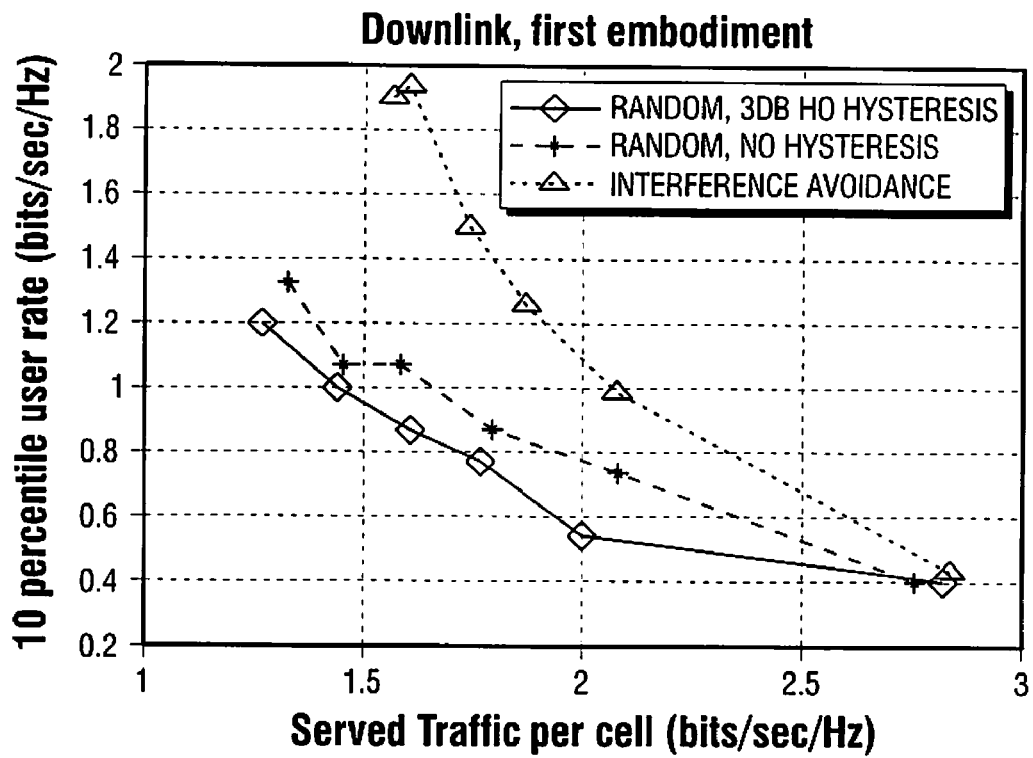
FIG. 7 is a graphical representation of the downlink performance of the centralized scheduler embodiment of the present invention compared to a conventional method with and without hysteresis.

FIG. 7 is a graphical representation of the downlink performance of the centralized scheduler embodiment of the present invention compared to a conventional method with and without hysteresis. The 10th percentile user data rate (bits/sec/Hz) is plotted against the average served traffic per cell (bits/sec/Hz). Lower served traffic corresponds to fewer active users in the system, and thus greater flexibility for the scheduler to avoid interference.

The upper curve illustrates the downlink performance of the interference avoidance method of the present invention. Two other curves are plotted for comparison purposes. The lowest curve labeled "Random, 3 dB HO hysteresis" represents the downlink performance of the conventional method in which there is no coordination among the cells, and UEs are randomly scheduled for transmission and reception. In addition, the conventional method imposes a handoff hysteresis of 3 dB, which means the cell a UE is attached to may be up to 3 dB weaker than the optimal anchor cell. The middle curve represents the downlink performance of the conventional random method without the hysteresis. With a served traffic level of approximately 1.5 bits/sec/Hz per cell, the conventional system can support a 10th percentile user data rate of approximately 1 bit/sec/Hz, both with and without the hysteresis. At the same level of served traffic, it can be seen that the present invention improves the performance by as much as 100 percent.

Figure 8:
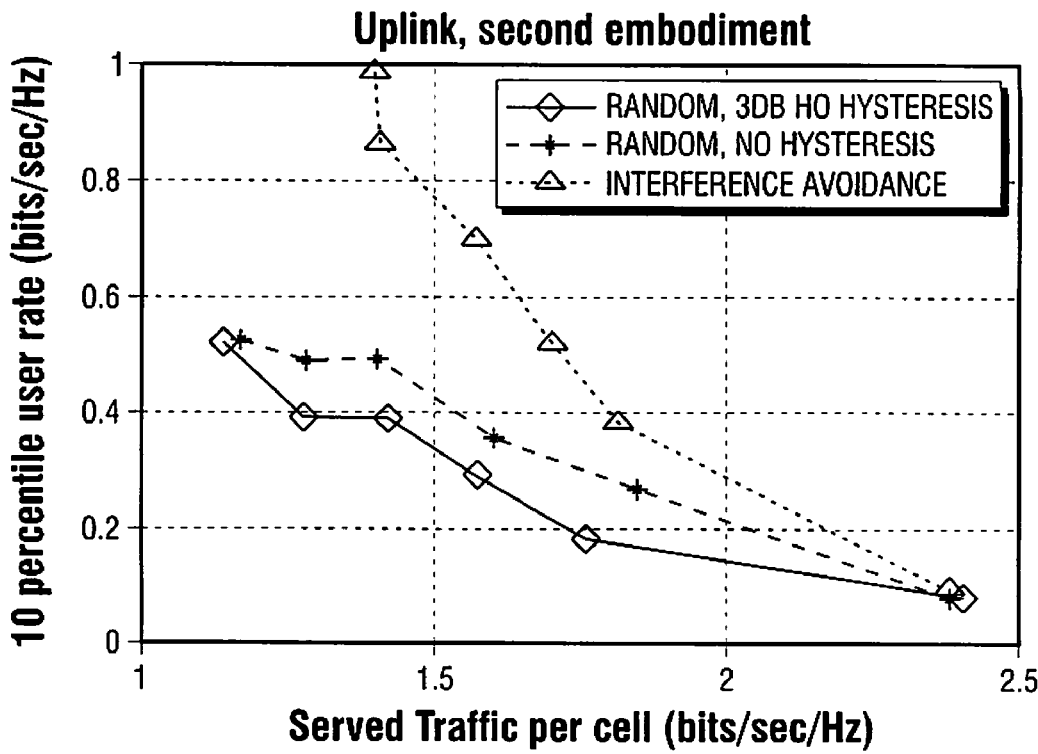
FIG. 8 is a graphical representation of the uplink performance of the centralized scheduler embodiment of the present invention compared to the conventional method as illustrated in FIG. 7.

FIG. 8 is a graphical representation of the uplink performance of the centralized scheduler embodiment of the present invention compared to the conventional method as illustrated in FIG. 7. Again, the present invention improves the uplink performance at all traffic loads, with improvement at lower traffic loads by as much as 100 percent.

Distributed Scheduler

In a second embodiment of the present invention, rather than utilizing a central CoMP cell controller, the invention utilizes a distributed method for coordinating the inter-cell interference in a CoMP system. Like the first embodiment, the multiple CoMP cells in a system deployment are grouped into a number of mutually exclusive subsets (FIG. 2). The CoMP cells in each subset are sufficiently separated so that no inter-CoMP-cell interference occurs among them and therefore they can be scheduled independently from each other. Again, each subset takes turn scheduling in a certain order (A, B, and then C in the example). The scheduling subset avoids causing interference to subsets that have already scheduled and then passes sufficient information to the remaining subsets so that the same interference avoidance measures can be taken. The scheduling and information passing preferably takes place before the data transmission phase, which occurs once every TTI.

In the centralized scheduler embodiments described above, the interference is determined by the path gains between the UEs and their surrounding sub-cells. The scheduler attempts to group and order UEs to be served simultaneously by their attached sub-cells in a way such that a certain Signal-to-Interference-Ratio (SIR) target is met. These embodiments are designed for the conventional system in which the UEs only transmit to and receive from their attached sub-cells. Under this condition, the transmission and reception do not alter the effective path gains, which can therefore be used to evaluate the SIR level.

For a more advanced solution, such as coherent CoMP that actively cancels or suppresses intra-cell interference, the transmission and reception may employ spatial filtering that alters the effective post-processing path gains between all UEs and the surrounding sub-cells. Under this condition, the coordinated scheduling solution that relies only on the pre-processing path gains to avoid interference is no longer applicable.

To further improve the performance of a coherent CoMP system by coordinating the inter-cell interference, the second embodiment of the present invention utilizes a distributed scheduling method, which accounts for the post-processing gain change due to the signal processing. The invention utilizes a new post-processing SIR measurement taking into account the spatial filtering at the transmitter or receiver.

First, some mathematical notations for the coherent CoMP system are provided.

Downlink

For the downlink, the received signals at the multiple UEs in a first CoMP cell can be expressed as a column vector in matrix form as:

$$r_1 = H_{11}s_1 + z_1, \qquad (1)$$

where $H_{11}$ is the downlink Multiple-Input Multiple-Output (MIMO) channel matrix between the UEs and the sub-cells; $z_1$ is the Additive White Gaussian Noise (AWGN); and $s_1$ is the signal vector transmitted by the sub-cells. Based on the knowledge of the channel matrix, the data symbols vector $d_1$ (of the same dimension as $r_1$) is mapped by a linear pre-coder $P_1$ to the transmit vector using:

$$s_1 = P_1 d_1, \qquad (2)$$

in a manner such as zero-forcing such that the interference from other users' symbols is suppressed.

For a neighboring second CoMP cell, the received signal vector can similarly be expressed as:

$$r_2 = H_{22}s_2 + z_2 = H_{22}P_2 d_2 + z_2. \qquad (3)$$

The two CoMP cells can be joined together in a single matrix representation:

$$\begin{bmatrix} r_1 \\ r_2 \end{bmatrix} = \begin{bmatrix} H_{11} & H_{12} \\ H_{21} & H_{22} \end{bmatrix} \begin{bmatrix} s_1 \\ s_2 \end{bmatrix} + \begin{bmatrix} z_1 \\ z_2 \end{bmatrix}, \qquad (4)$$

where $H_{12}$ and $H_{21}$ are the inter-CoMP cell MIMO channel matrices between the two CoMP cells. More CoMP cells can be appended to Equation (4) if necessary. Replacing $s_1$ and $s_2$ by $P_1 d_1$ and $P_2 d_2$ respectively, Equation (4) becomes:

$$\begin{bmatrix} r_1 \\ r_2 \end{bmatrix} = \begin{bmatrix} H_{11} & H_{12} \\ H_{21} & H_{22} \end{bmatrix} \begin{bmatrix} P_1 d_1 \\ P_2 d_2 \end{bmatrix} + \begin{bmatrix} z_1 \\ z_2 \end{bmatrix} \qquad (5)$$

$$= \begin{bmatrix} G_{11} & G_{12} \\ G_{21} & G_{22} \end{bmatrix} \begin{bmatrix} d_1 \\ d_2 \end{bmatrix} + \begin{bmatrix} z_1 \\ z_2 \end{bmatrix},$$

where $$\begin{bmatrix} G_{11} & G_{12} \\ G_{21} & G_{22} \end{bmatrix} = \begin{bmatrix} H_{11}P_1 & H_{12}P_2 \\ H_{21}P_1 & H_{22}P_2 \end{bmatrix} \qquad (6)$$

is the post-processing gain matrix.

Uplink

Generally, there is no pre-coding on the uplink. The vector signal received at the multiple points in a CoMP cell is thus given by:

$$r_1 = H_{11}d_1 + z_1. \qquad (7)$$

The data symbol vector is often estimated using a linear operator $Q_1$ such as Minimum Mean Square Estimator (MMSE):

$$\hat{d}_1 = Q_1 r_1 = Q_1 H_{11} d_1 + Q_1 z_1. \qquad (8)$$

Similarly, a system consisting of two or more CoMP cells can be expressed as:

$$\begin{bmatrix} \hat{d}_1 \\ \hat{d}_2 \end{bmatrix} = \begin{bmatrix} G_{11} & G_{12} \\ G_{21} & G_{22} \end{bmatrix} \begin{bmatrix} d_1 \\ d_2 \end{bmatrix} + \begin{bmatrix} \tilde{z}_1 \\ \tilde{z}_2 \end{bmatrix}, \qquad (9)$$

where $$\begin{bmatrix} G_{11} & G_{12} \\ G_{21} & G_{22} \end{bmatrix} = \begin{bmatrix} Q_1 H_{11} & Q_1 H_{12} \\ Q_2 H_{21} & Q_2 H_{22} \end{bmatrix} \qquad (10)$$

is the post-processing gain matrix, and $$\begin{bmatrix} \tilde{z}_1 \\ \tilde{z}_2 \end{bmatrix} = \begin{bmatrix} Q_1 z_1 \\ Q_2 z_2 \end{bmatrix} \qquad (11)$$

is the noise vector.

The post-processing gain matrix given by Equation (6) for the downlink and Equation (10) for the uplink clearly indicate the altering of the path gain matrix by the processing (or spatial filtering). Ideally, these gain matrices should be nearly diagonal so that the estimated symbol experiences little or no interference from other symbols. However, if there is no coordination between the two neighboring CoMP cells, there is no control over the off-diagonal elements $G_{12}$ and $G_{21}$ in Equations (6) and (10) since they depend on the pre-coding matrices and channel matrices that are under the control of the interfering CoMP cell.

Figure 9:
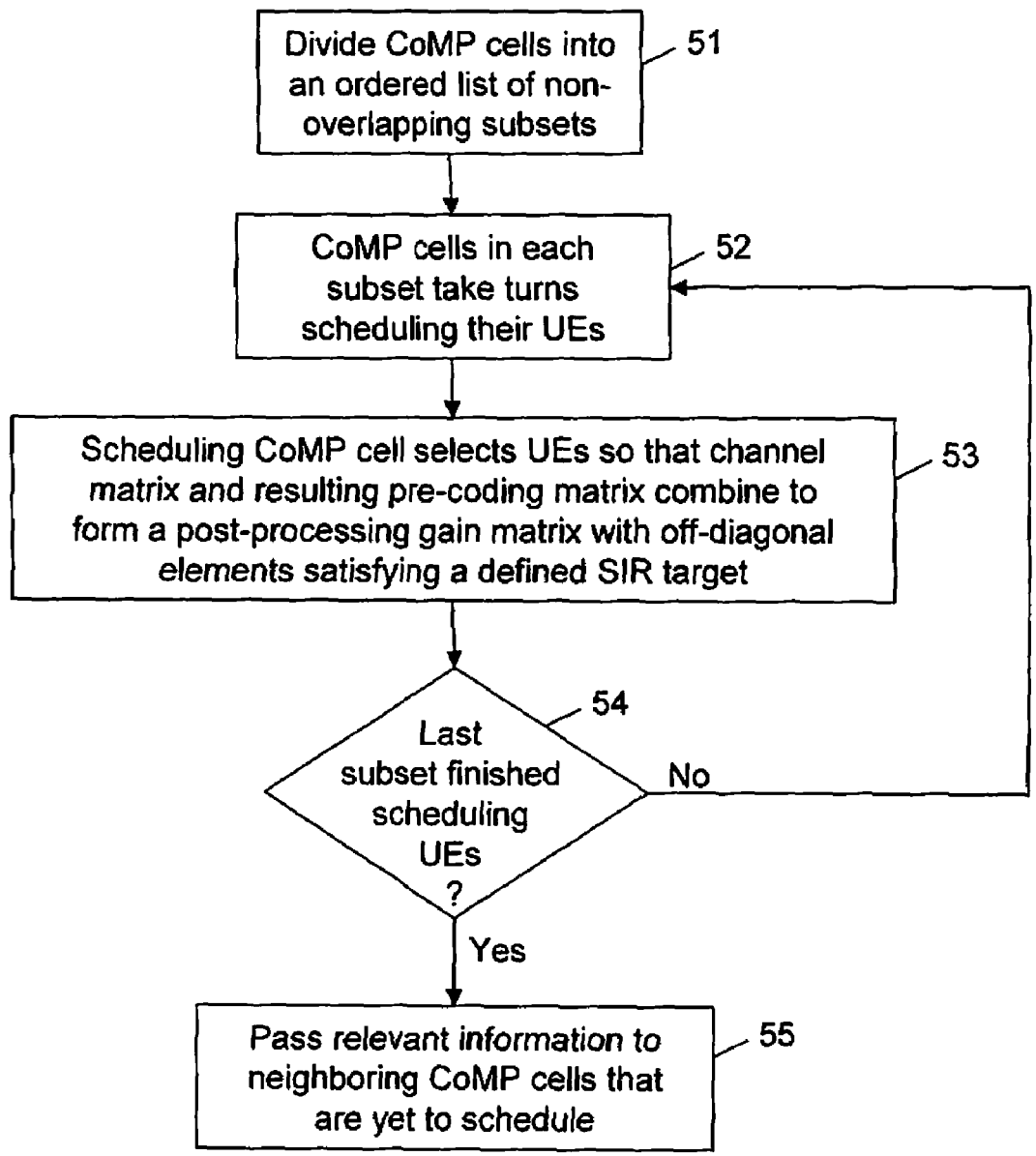
FIG. 9 is a flow chart illustrating the steps of an embodiment of the method of the present invention utilizing a new post-processing SIR measurement.

FIG. 9 is a flow chart illustrating the steps of an embodiment of the method of the present invention utilizing a new post-processing SIR measurement. At step 51, the CoMP cells are divided into an ordered list of non-overlapping subsets. At step 52, the CoMP cells in each subset then take turns scheduling their UEs. At step 53, the scheduling CoMP cell selects the UEs in such a way that the channel matrix and the resulting pre-coding matrix combine to form a post-processing gain matrix with off-diagonal elements satisfying a defined SIR target. At step 54, it is determined whether the last subset has finished scheduling its UEs. If not, the method returns to step 52 and the next subset schedules its UEs. When the last subset has finished scheduling its UEs, the method moves to step 55 where the scheduling CoMP cell passes relevant information to neighboring CoMP cells that are yet to schedule.

The following sections describe this procedure in detail, starting from one of the CoMP cells in the first subset in the ordered list, followed by CoMP cells in the subsequent subsets. A downlink system is used as example. Extension to the uplink is straightforward with simple notational changes.

Scheduling in the First CoMP Cell

Select first UE with data symbol $d_{1,1}$ from the first CoMP cell and calculate the corresponding pre-coding weight $P_1^{(1)}$. With the definition:

$$d_1^{(1)} \equiv d_{1,1}, \quad (12)$$

the similarly denoted post processing received signal is then given by:

$$r_1^{(1)} = G_{11}^{(1)} d_1^{(1)} + z_1^{(1)}, \quad (13)$$

Continue with the next UE with data symbol $d_{1,2}$ and find the corresponding pre-coding matrix for the data symbol vector using:

$$d_1^{(2)} \equiv \begin{bmatrix} d_{1,1} \\ d_{1,2} \end{bmatrix}, \quad (14)$$

of the two UEs. The post-processing received vector is then given by:

$$r_1^{(2)} = G_{11}^{(2)} d_1^{(2)} + z_1^{(2)}, \quad (15)$$

where $G_{11}^{(2)}$ is a 2×2 matrix. Ideally, the off-diagonal elements of this post-processing gain matrix should be as small as possible compared with the diagonal elements. If certain criteria are met, the second UE is kept in the schedule. Otherwise, it is returned to the queue and the next UE in the queue is picked and tested for the criteria. The process continues until all UEs in the queues are exhausted and the post-processing received signal vector for the scheduled UEs in the first CoMP cell is given by:

$$r_1 = G_{11} d_1 + z_1, \quad (16)$$

where $$d_1 \equiv \begin{bmatrix} d_{1,1} \\ d_{1,2} \\ d_{1,3} \\ \vdots \end{bmatrix}, \quad (17)$$

is the symbol vector for all the scheduled UEs in the first CoMP cell.

After the scheduling is completed, the first CoMP cell then passes the relevant information to the neighboring CoMP cells that are yet to schedule.

Scheduling for Subsequent CoMP Cells

The UEs in subsequent CoMP cells in the ordered list are also sorted in a similar manner. Let $d_2^{(1)} \equiv d_{2,1}$ be the data symbol of the first UE in the second CoMP cell to be tested for compatibility with the UEs already scheduled in the first CoMP cell. The post-processing received signal vector of both CoMP cells is then given by:

$$\begin{bmatrix} r_1 \\ r_2^{(1)} \end{bmatrix} = \begin{bmatrix} H_{11} & H_{12}^{(1)} \\ H_{21}^{(1)} & H_{22}^{(1)} \end{bmatrix} \begin{bmatrix} P_1 d_1 \\ P_2^{(1)} d_2^{(1)} \end{bmatrix} + \begin{bmatrix} z_1 \\ z_2^{(1)} \end{bmatrix} \quad (18)$$

$$= \begin{bmatrix} G_{11} & G_{12}^{(1)} \\ G_{21}^{(1)} & G_{22}^{(1)} \end{bmatrix} \begin{bmatrix} d_1 \\ d_2^{(1)} \end{bmatrix} + \begin{bmatrix} z_1 \\ z_2^{(1)} \end{bmatrix},$$

where $P_2^{(1)}$ is the corresponding pre-coder for the UE in the second CoMP cell. Note that when calculating $P_2^{(1)}$, the current CoMP cell may take into account the variables that have been determined by the prior CoMP cell, but it cannot change them. Therefore, to mitigate interference, the current CoMP cell selects which UE to include in the schedule. This essentially determines $H_{22}^{(1)}$, $H_{12}^{(1)}$, $H_{21}^{(1)}$ and subsequently $P_2^{(1)}$. If the inclusion of a given UE in the schedule satisfies certain criteria such as those described above, the UE is kept in the schedule. Otherwise, it is returned to the queue and the next UE in the queue is picked and tested for the criteria.

The process continues for the next UE to be tested for compatibility with all UEs already scheduled in both CoMP cells. The resulting post-processing received signal vector is then given by:

$$\begin{bmatrix} r_1 \\ r_2^{(2)} \end{bmatrix} = \begin{bmatrix} H_{11} & H_{12}^{(2)} \\ H_{21}^{(2)} & H_{22}^{(2)} \end{bmatrix} \begin{bmatrix} P_1 d_1 \\ P_2^{(2)} d_2^{(2)} \end{bmatrix} + \begin{bmatrix} z_1 \\ z_2^{(2)} \end{bmatrix} \quad (19)$$

$$= \begin{bmatrix} G_{11} & G_{12}^{(2)} \\ G_{21}^{(2)} & G_{22}^{(2)} \end{bmatrix} \begin{bmatrix} d_1 \\ d_2^{(2)} \end{bmatrix} + \begin{bmatrix} z_1 \\ z_2^{(2)} \end{bmatrix},$$

where $$d_2^{(2)} \equiv \begin{bmatrix} d_{2,1} \\ d_{2,2} \end{bmatrix}, \quad (20)$$

and $P_2^{(2)}$ is the corresponding pre-coding weight. Again, the UE under test is kept in the schedule if the post-processing gain matrix in Equation (19) satisfies certain criteria. Otherwise, it is returned to the queue. The process continues until all UEs in the current CoMP cell are exhausted.

The same procedure continues for the next subset of CoMP cells in the ordered list until all subsets are exhausted. In the next scheduling phase, the ordering of the subsets may be alternated to ensure fairness.

Figure 10:
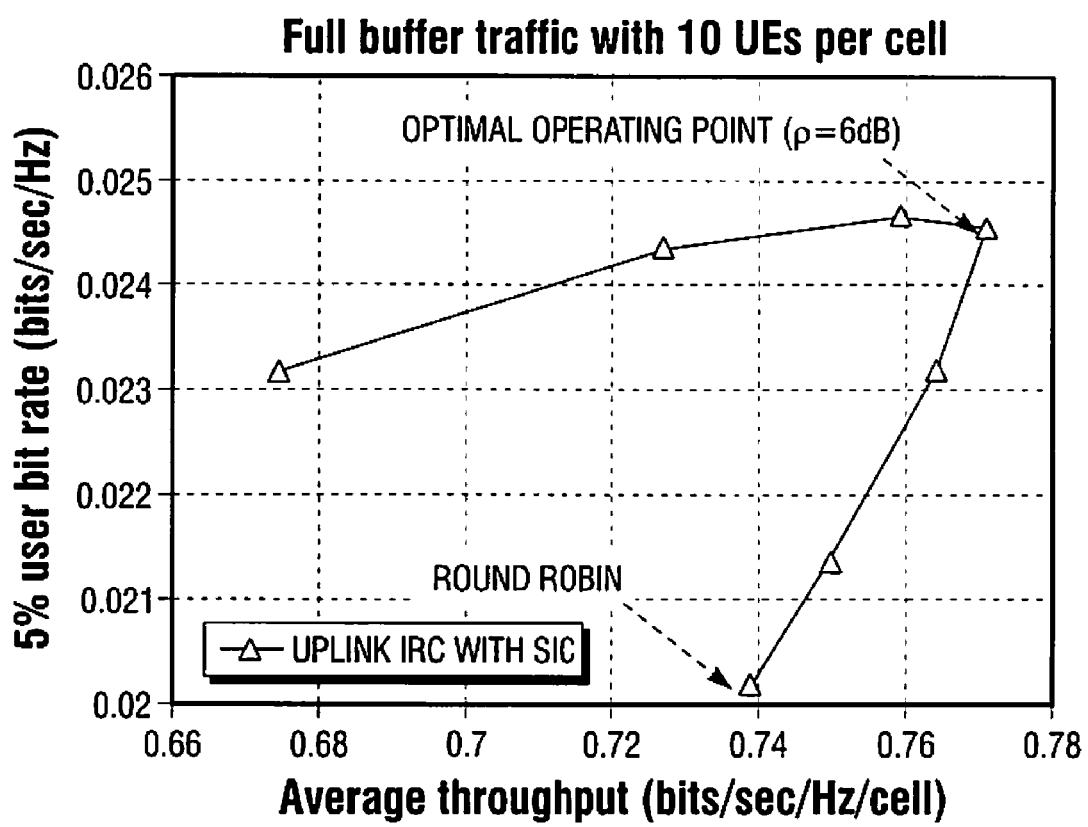
FIG. 10 is a graphical representation of the simulated uplink performance of the distributed scheduler embodiment of the present invention compared to a conventional round-robin scheduler without coordination.

FIG. 10 is a graphical representation of the simulated uplink performance of the distributed scheduler embodiment of the present invention compared to a conventional round-robin scheduler without coordination. The simulations considered the CoMP cells layout shown in FIG. 1. Wrapping-around of three CoMP cells emulates an infinite and borderless layout. On average, there are 10 UEs in each sub-cell with full-buffer data. The 5th percentile user data rate (bits/sec/Hz) is plotted against the average served traffic per cell (bits/sec/Hz).

Each point on the curve in FIG. 10 corresponds to the SIR target threshold ρ, with a step of 2 dB starting from 0. AT ρ=0, it corresponds to the conventional round-robin scheduler without any coordination. It is clear that at the optimal threshold of ρ=6 dB, the disclosed method can improve the 5th percentile user bit rate by more than 20 percent over the conventional round-robin scheduler while increasing the system throughput slightly by four percent.

Figure 11:
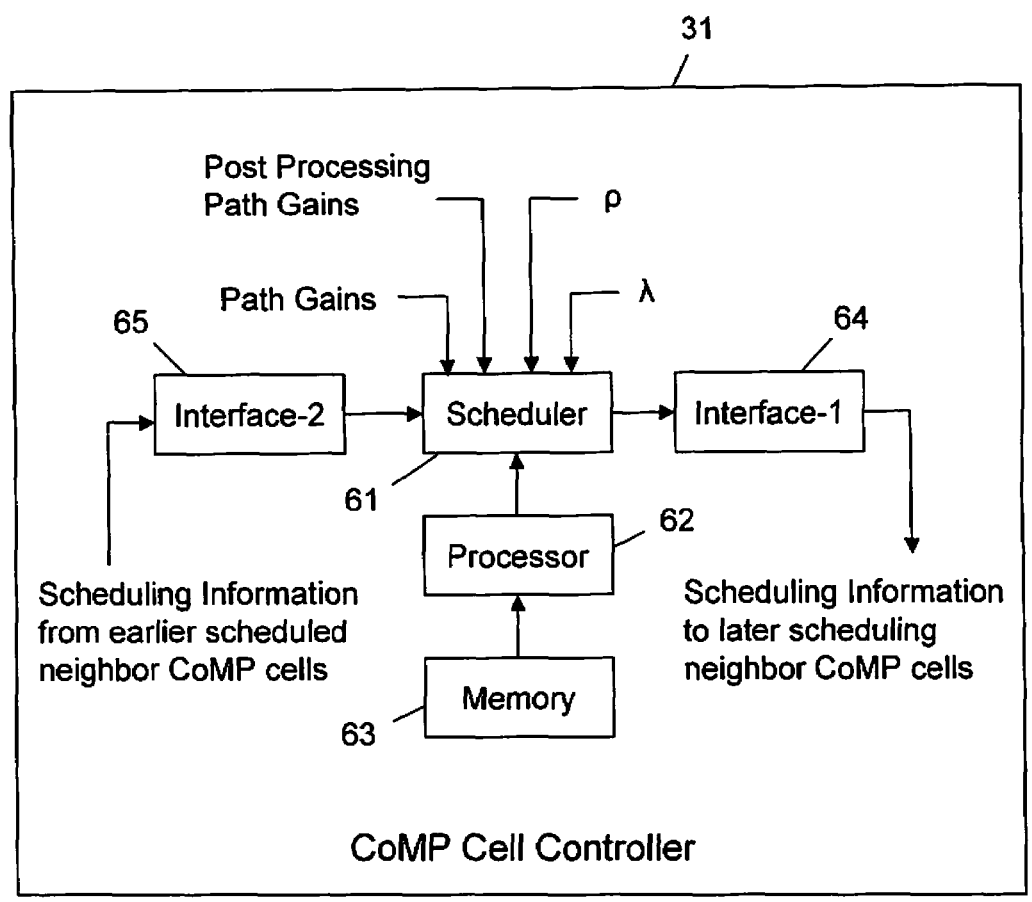
FIG. 11 is a simplified block diagram of an exemplary embodiment of a CoMP cell controller according to the teachings of the present invention.

FIG. 11 is a simplified block diagram of an exemplary embodiment of a CoMP cell controller 31 according to the teachings of the present invention. The CoMP cell controller is communicatively linked to the plurality of base stations in the sub-cells of the associated CoMP cell. A scheduler 61 schedules transmissions to and from UEs in the sub-cells of the CoMP cell to minimize intra-CoMP-cell interference among the sub-cells within the CoMP cell. A processor 62 runs computer program instructions stored on a memory 63. When the instructions are run, the processor causes the scheduler to schedule transmissions such that no UE in the CoMP cell experiences interference greater than the defined threshold λ. Alternatively, the scheduler may schedule transmissions such that the total interference experienced by a given UE does not exceed a defined threshold. In other words, the scheduler schedules transmissions such so that the total interference experienced by any of the UEs does not result in a signal-to-interference ratio (SIR) budget ρ being exceeded.

As previously noted, the CoMP cells in the network are divided into mutually exclusive subsets, and the CoMP cells in the different subsets may rotate the order in which they schedule their transmissions. Thus, any given CoMP cell controller 31 may be in the first, second, or third subset to schedule, given the scenario described above. If the CoMP cell is in the first or second subset to schedule, a first interface (Interface-1) 64 is used to send scheduling information from the CoMP cell controller to neighboring CoMP cells that have not yet scheduled. If the CoMP cell in is the second or third subset to schedule, a second interface (Interface-2) 65 is used to receive scheduling information in the CoMP cell controller from neighboring CoMP cells that have finished scheduling. The scheduler 61 then uses the received scheduling information when determining the scheduling of transmissions in its associated CoMP cell.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of reducing inter-cell interference within a Coordinated Multi-Point (CoMP) cellular network architecture having a plurality of CoMP cells, wherein each CoMP cell includes a plurality of sub-cells in which radio transmissions are made to and from User Equipments (UEs), said method comprising the steps of:
grouping the plurality of CoMP cells into a number of mutually exclusive subsets, wherein the CoMP cells in each subset are sufficiently separated from each other geographically so that no inter-CoMP-cell interference occurs among the CoMP cells in any given subset;
scheduling transmissions to and from UEs in the sub-cells of the CoMP cells in a first subset to minimize intra-CoMP-cell interference among the sub-cells within the CoMP cells in the first subset, wherein transmissions in the downlink direction in a given CoMP cell in the first subset are scheduled so that none of the UEs experience interference that exceeds a threshold λ;
passing scheduling information from each of the CoMP cells in the first subset to neighboring CoMP cells in all other subsets; and
scheduling transmissions to and from UEs in the sub-cells of the CoMP cells in a second subset, wherein transmissions in the second subset are scheduled to minimize intra-CoMP-cell interference among the sub-cells within the CoMP cells in the second subset, and wherein transmissions in the second subset are also scheduled utilizing the scheduling information received from the first subset to minimize inter-CoMP-cell interference with CoMP cells in the first subset.

2. The method according to claim 1, further comprising the steps of:
passing scheduling information from each of the CoMP cells in the second subset to neighboring CoMP cells in all other subsets except the first subset; and
scheduling transmissions to and from UEs in the sub-cells of the CoMP cells in a third subset, wherein transmissions in the third subset are scheduled to minimize intra-CoMP-cell interference among the sub-cells within the CoMP cells in the third subset, and wherein transmissions in the third subset are also scheduled utilizing the scheduling information received from the first and second subsets to minimize inter-CoMP-cell interference with CoMP cells in the first and second subsets.

3. The method according to claim 2, wherein the scheduling and passing steps are all performed within a Transmission Time Interval (TTI) before data is transmitted to or from the UEs.

4. The method according to claim 1, wherein the step of scheduling the transmissions in the downlink direction in a given CoMP cell so that none of the UEs experience interference that exceeds a threshold λ includes the steps of:
setting the threshold λ for dominant interferers;
forming a binary matrix indicating a strong correspondence between a UE and a base station;
creating an ordered list of UEs in the given CoMP cell, wherein the UEs are ordered according to a quality measure defined as either the highest path gain between a given UE and all the base stations in the CoMP cell, or the number of strong base stations seen by the given UE; and
moving the UEs in the ordered list to a schedule list one by one if the interference experienced by each given UE is less than the threshold λ.

5. The method according to claim 1, wherein the step of scheduling transmissions to and from UEs in the sub-cells of the CoMP cells in the first subset includes scheduling the transmissions in the uplink direction in a given CoMP cell so that none of the base stations experience interference that exceeds a threshold λ.

6. The method according to claim 5, wherein the step of scheduling the transmissions in the uplink direction in a given CoMP cell so that none of the base stations experience interference that exceeds a threshold λ includes the steps of:
setting the threshold λ for dominant interferers;
forming a binary matrix indicating a strong correspondence between a UE and a base station;
creating an ordered list of UEs in the given CoMP cell, wherein the UEs are ordered according to a quality measure defined as either the highest path gain between a given base station and all the UEs in the CoMP cell, or the number of strong UEs seen by the given base station; and
moving the UEs in the ordered list to a schedule list one by one if the interference experienced by each given base station is less than the threshold λ.

7. The method according to claim 1, further comprising utilizing coherent CoMP signal processing to actively cancel or suppress intra-CoMP-cell interference, wherein the scheduling steps include selecting UEs for transmission taking into account the post-processing gain change due to the coherent CoMP signal processing.

8. The method according to claim 7, wherein the step of scheduling transmissions to and from UEs in the sub-cells of the CoMP cells in the first subset includes selecting the UEs in such a way that a channel matrix and a resulting pre-coding matrix combine to form a post-processing gain matrix with off-diagonal elements satisfying a defined signal-to-interference ratio (SIR) target.

9. A method of reducing inter-cell interference within a Coordinated Multi-Point (CoMP) cellular network architecture having a plurality of CoMP cells, wherein each CoMP cell includes a plurality of sub-cells in which radio transmissions are made to and from User Equipments (UEs), said method comprising the steps of:
grouping the plurality of CoMP cells into a number of mutually exclusive subsets, wherein the CoMP cells in each subset are sufficiently separated from each other geographically so that no inter-CoMP-cell interference occurs among the CoMP cells in any given subset;
scheduling transmissions to and from UEs in the sub-cells of the CoMP cells in a first subset to minimize intra-CoMP-cell interference among the sub-cells within the CoMP cells in the first subset, wherein transmissions in the downlink direction in a given CoMP cell in the first subset are scheduled so that the total interference experienced by any of the UEs does not result in a signal-to-interference ratio (SIR) budget $\rho$ being exceeded;
passing scheduling information from each of the CoMP cells in the first subset to neighboring CoMP cells in all other subsets; and
scheduling transmissions to and from UEs in the sub-cells of the CoMP cells in a second subset, wherein transmissions in the second subset are scheduled to minimize intra-CoMP-cell interference among the sub-cells within the CoMP cells in the second subset, and wherein transmissions in the second subset are also scheduled utilizing the scheduling information received from the first subset to minimize inter-CoMP-cell interference with CoMP cells in the first subset.

10. The method according to claim 9, wherein the step of scheduling the transmissions in the downlink direction in a given CoMP cell so that the total interference experienced by any of the UEs does not result in the SIR budget $\rho$ being exceeded includes the steps of:
setting the SIR budget $\rho$;
creating an ordered list of UEs in the given CoMP cell, wherein the UEs are ordered according to a quality measure defined as either the highest path gain between a given UE and all the base stations in the CoMP cell, or proximity to the CoMP cell border; and
moving the UEs in the ordered list to a schedule list one by one if the SIR budget $\rho$ is met.

11. The method according to claim 9, further comprising utilizing coherent CoMP signal processing to actively cancel or suppress intra-CoMP-cell interference, wherein the scheduling steps include selecting UEs for transmission taking into account the post-processing gain change due to the coherent CoMP signal processing.

12. The method according to claim 9, wherein the step of scheduling transmissions to and from UEs in the sub-cells of the CoMP cells in the first subset includes selecting the UEs in such a way that a channel matrix and a resulting pre-coding matrix combine to form a post-processing gain matrix with off-diagonal elements satisfying a defined signal-to-interference ratio (SIR) target.

13. A centralized Coordinated Multi-Point (CoMP) cell controller communicatively linked to a plurality of base stations, each base station providing radio communications to and from a plurality of User Equipments (UEs) in a sub-cell of a first CoMP cell, said first CoMP cell comprising a plurality of sub-cells, wherein the cell controller comprises:
a scheduler for scheduling transmissions to and from UEs in the sub-cells of the first CoMP cell to minimize intra-CoMP-cell interference among the sub-cells within the first CoMP cell, said scheduler including means for scheduling transmissions such that no UE in the CoMP cell experiences interference greater than a defined threshold $\lambda$; and
a first communication interface for sending to a controller of a neighboring, second CoMP cell, scheduling information regarding transmissions scheduled to and from UEs in sub-cells at a border between the first and second CoMP cells, in advance of the transmissions.

14. The CoMP cell controller according to claim 13, wherein the CoMP cell controller includes a processor for running computer program instructions stored in a memory, wherein when the program instructions are run on the processor, the processor causes the CoMP cell controller to perform the steps of:
setting a threshold $\lambda$ for dominant interferers;
forming a binary matrix indicating a strong correspondence between a UE and a base station;
creating an ordered list of UEs in the given CoMP cell, wherein the UEs are ordered according to a quality measure defined as either the highest path gain between a given UE and all the base stations in the CoMP cell, or the number of strong base stations seen by the given UE; and
moving the UEs in the ordered list to a schedule list one by one if the interference experienced by each given UE is less than the threshold $\lambda$.

15. The CoMP cell controller according to claim 13, further comprising:
a second communication interface for receiving from a controller of a third CoMP cell, scheduling information regarding transmissions scheduled to and from UEs in sub-cells in the third CoMP cell; and
wherein the scheduler schedules transmissions to and from UEs in sub-cells at a border between the first and third CoMP cells based on both intra-CoMP-cell interference levels among the sub-cells within the first CoMP cell as well as the scheduling information received from the controller of the third CoMP cell.

16. The CoMP cell controller according to claim 13, further comprising means for utilizing coherent CoMP signal processing to actively cancel or suppress intra-CoMP-cell interference, wherein the scheduler selects UEs for transmission taking into account the post-processing gain change due to the coherent CoMP signal processing.

17. The CoMP cell controller according to claim 16, wherein the scheduler includes means for selecting the UEs in such a way that a channel matrix and a resulting pre-coding matrix combine to form a post-processing gain matrix with off-diagonal elements satisfying a defined signal-to-interference ratio (SIR) target.

18. A centralized Coordinated Multi-Point (CoMP) cell controller communicatively linked to a plurality of base stations, each base station providing radio communications to and from a plurality of User Equipments (UEs) in a sub-cell of a first CoMP cell, said first CoMP cell comprising a plurality of sub-cells, wherein the cell controller comprises:
- a scheduler for scheduling transmissions to and from UEs in the sub-cells of the first CoMP cell to minimize intra-CoMP-cell interference among the sub-cells within the first CoMP cell, said scheduler including means for scheduling transmissions such that the total interference experienced by any of the UEs does not result in a signal-to-interference ratio (SIR) budget ρ being exceeded; and
- a first communication interface for sending to a controller of a neighboring, second CoMP cell, scheduling information regarding transmissions scheduled to and from UEs in sub-cells at a border between the first and second CoMP cells, in advance of the transmissions.

19. The CoMP cell controller according to claim 18, wherein the scheduler includes:
- means for setting the SIR budget ρ;
- means for creating an ordered list of UEs in the given CoMP cell, wherein the UEs are ordered according to a quality measure defined as either the highest path gain between a given UE and all the base stations in the CoMP cell, or proximity to the CoMP cell border; and
- means for moving the UEs in the ordered list to a schedule list one by one if the SIR budget ρ is met.

20. A system in a cellular communication network for minimizing inter-cell interference among Coordinated Multi-Point (CoMP) cells, the system comprising:
- a first CoMP cell controller communicatively linked to a first plurality of network transceivers, each transceiver providing radio communications to User Equipments (UEs) in a sub-cell of the CoMP cell;
- a second CoMP cell controller communicatively linked to a second plurality of network transceivers neighboring the first plurality of network transceivers;
- wherein the first and second CoMP cell controllers each include:
  - a scheduler for scheduling transmissions with UEs in sub-cells of the first and second CoMP cells, respectively, to ensure that no UE in each respective CoMP cell experiences interference greater than a defined threshold λ, wherein the schedulers generate scheduling information; and
  - a communication interface for transmitting from the first CoMP cell controller to the second CoMP cell controller, scheduling information generated by the scheduler of the first CoMP cell controller regarding transmissions scheduled to and from UEs in sub-cells at the border of the first CoMP cell, in advance of the transmissions;
- wherein the scheduler of the second CoMP cell controller includes means for utilizing the scheduling information transmitted by the first CoMP cell controller to schedule transmission to and from UEs in the in sub-cells at the border of the second CoMP cell so as to minimize inter-CoMP cell interference between the first CoMP cell and the second CoMP cell.

* * * * *

UNITED STATES PATENT AND TRADEMARK OFFICE
CERTIFICATE OF CORRECTION

PATENT NO. : 8,145,223 B2
APPLICATION NO. : 12/491675
DATED : March 27, 2012
INVENTOR(S) : Guey It is certified that error appears in the above-identified patent and that said Letters Patent is hereby corrected as shown below:

In Column 4, Line 65, delete "as" and insert -- (as --, therefor.

Signed and Sealed this
Twenty-sixth Day of June, 2012

David J. Kappos
*Director of the United States Patent and Trademark Office*